No. 752,577. PATENTED FEB. 16, 1904.
I. S. McDOUGALL.
APPARATUS FOR HUMIDIFYING AIR.
APPLICATION FILED JAN. 19, 1903.
NO MODEL.

Attest:
C. Middleton
R. C. Durand

Inventor:
Isaac S. McDougall
by Ellis Spear & Company
Atty's.

THE NORRIS PETERS CO., PHOTO-LITHO., WASHINGTON, D. C.

No. 752,577. Patented February 16, 1904.

UNITED STATES PATENT OFFICE.

ISAAC SHIMWELL McDOUGALL, OF MANCHESTER, ENGLAND.

APPARATUS FOR HUMIDIFYING AIR.

SPECIFICATION forming part of Letters Patent No. 752,577, dated February 16, 1904.

Original application filed December 28, 1901, Serial No. 87,633. Divided and this application filed January 19, 1903. Serial No. 139,647. (No model.)

*To all whom it may concern:*

Be it known that I, ISAAC SHIMWELL MC-DOUGALL, engineer, a subject of the King of Great Britain and Ireland, residing at 68 Port street, Manchester, in the county of Lancaster, England, have invented certain new and useful Improvements in Apparatus for Humidifying Air, (for which I have made application for Letters Patent in Great Britain, No. 13,152, of June 27, 1901,) of which the following is a specification.

My invention relates to apparatus adapted for use in humidifying air used for heating and ventilating purposes.

My invention consists in an apparatus adapted for this purpose, which apparatus will be fully described in the specification and its novel features pointed out in the claims.

Figure 1:
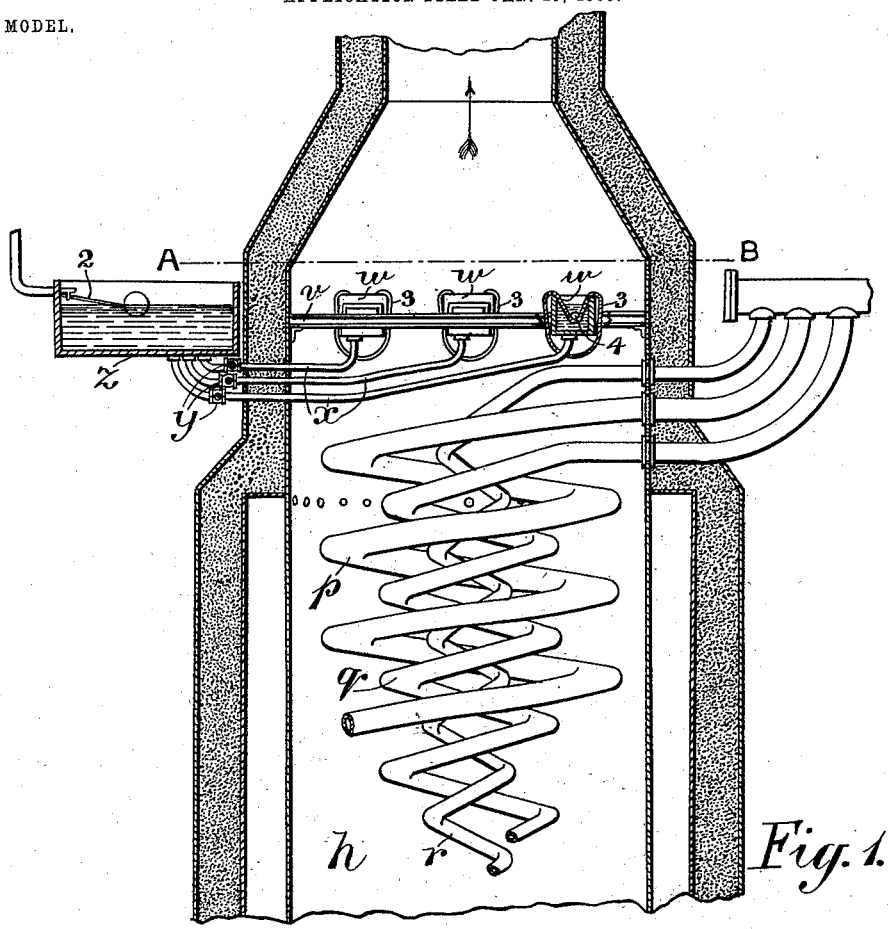
Figure 2:
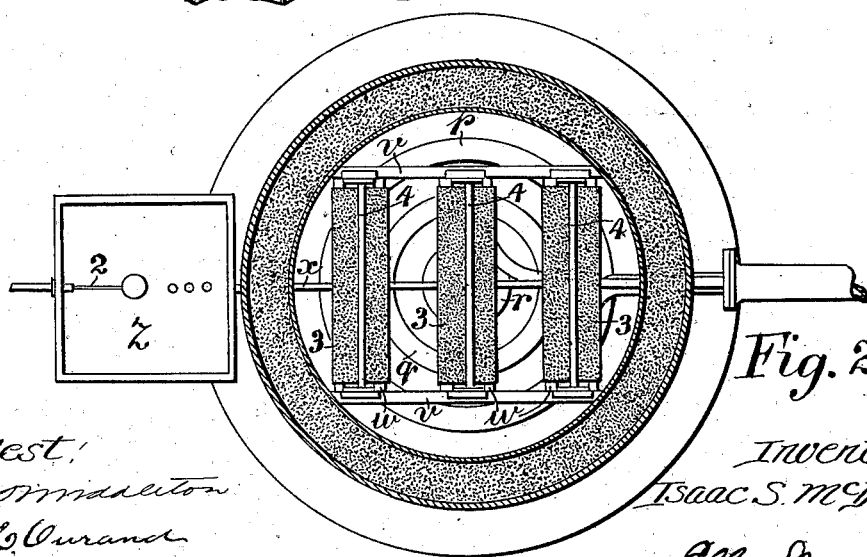

Referring to the accompanying drawings, which illustrate my invention, Figure 1 shows in vertical section an air-heating chamber provided with a humidifying apparatus constructed according to my invention. Fig. 2 shows the same in horizontal section, the section being taken on the line A B of Fig. 1.

Only part of the air-heating chamber $h$ and coils $p\ q\ r$ are shown in the drawings, as the chamber and coils do not in themselves form part of this invention. Hot water is passed through the coils $p\ q\ r$, and air passes upward through the chamber $h$ between the coils. In any convenient part of the air-heating chamber (preferably at the top) are placed the tanks $w$, which are supported on the beams $v$, extending across the chamber. The tanks $w$ communicate, by means of pipes $x$, provided with cocks $y$, with a cistern $z$ containing water. A float-valve 2 or other automatic valve is provided for the purpose of maintaining constant the water-level in the cistern. When the cocks $y$ are open, as they are normally, the water will stand at the same height in the tanks $w$ as in the cistern $z$. Pieces of fibrous material 3 are allowed to dip into the tanks and then to pass over their sides and to hang down around the tanks. Water saturates the fibrous material by capillary action, and thus a large amount of wet surface is exposed to the hot air as it leaves the air-heating chamber. The heated air is in a condition to take up moisture and obtains this from the wet surface of the fibrous material. The material is preferably formed in endless bands, the width of each band being that of the length of the tank which it envelops. The material passes below bars 4, which extend the length of the tanks and below the level of the water in them. These bars can be arranged to pass below snugs or catches in the ends of the tanks, so that they can be withdrawn when desired. The tanks preferably only rest on the beams $v$ and are not fastened down to them, so that any tank can be lifted away when desired. As the air does not require to pass through the saturated fibrous material, but only pass round it, no resistance is offered to the passage of the air.

This application is a division of that filed by me December 28, 1901, No. 87,633.

Having now described my invention, what I claim as new, and desire to secure by Letters Patent, is—

1. In combination with an air-heater comprising means for directing a current of air upwardly, a water-tank located in the path of the upward draft of hot air through the said means, an endless band dipping into the said tank and extending down outside the same and under the bottom, said bottom and side portions of the band being exposed to the ascending air-current and means for supplying the tank with water, substantially as described.

2. In combination with an air-heating chamber, a tank therein, an endless band dipping into the tank and extending down outside and under the tank where it is exposed to the ascending air-current, a cistern, a valved connection between the tank and cistern and means for maintaining a body of water at one level within the cistern and tank, substantially as described.

3. In combination, an air-heater, a plurality of water-tanks disposed at different points in said air-heating chamber, an endless band for each tank dipping into the same, and exposed to ascending air-currents along the sides and under the bottom of the water-tanks, a cistern and independent valved connections between the cistern and the water-tanks whereby any or all of the tanks may be put out of operation, substantially as described.

4. In combination with an air-heater, a plurality of water-tanks disposed therein at one level and having spaces between and around them for the passage of the heated air, bands in the tanks depending therefrom and exposed below the said tanks, a cistern and means for supplying the water-tanks therefrom, said means including valved connections and said cistern having means for maintaining a certain level of water therein, substantially as described.

In witness whereof I have hereunto set my hand in presence of two witnesses.

ISAAC SHIMWELL McDOUGALL.

Witnesses:
VIVIAN ARTHUR HUGHES,
ROBERT MORRISON NEILSON.